(12) United States Patent
Erickson et al.

(10) Patent No.: US 11,537,109 B2
(45) Date of Patent: Dec. 27, 2022

(54) SERVER AND SYSTEM FOR AUTOMATIC SELECTION OF TAGS FOR MODELING AND ANOMALY DETECTION

(71) Applicant: AVEVA Software, LLC, Lake Forest, CA (US)

(72) Inventors: Brian Kenneth Erickson, Long Beach, CA (US); Greg C. Clinton, Mission Viejo, CA (US); Vinay T. Kamath, Rancho Santa Margarita, CA (US); Abhijit Manushree, Laguna Niguel, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 420 days.

(21) Appl. No.: 16/534,853

(22) Filed: Aug. 7, 2019

(65) Prior Publication Data

US 2020/0050179 A1 Feb. 13, 2020

Related U.S. Application Data

(60) Provisional application No. 62/715,746, filed on Aug. 7, 2018.

(51) Int. Cl.
*G05B 19/418* (2006.01)
*G06F 17/16* (2006.01)
*G06F 17/18* (2006.01)

(52) U.S. Cl.
CPC ......... *G05B 19/4183* (2013.01); *G06F 17/16* (2013.01); *G06F 17/18* (2013.01)

(58) Field of Classification Search
CPC ...... G05B 19/4183; G06F 17/16; G06F 17/18
See application file for complete search history.

(56) References Cited

U.S. PATENT DOCUMENTS

2003/0139908 A1 7/2003 Wegerich et al.
2011/0018714 A1 1/2011 Jun et al.
(Continued)

FOREIGN PATENT DOCUMENTS

KR 10-2011-0010546 A 2/2011

OTHER PUBLICATIONS

Zio et al., "Genetic Algorithms for Grouping of Signals for System Monitoring and Diagnostics" Risk, Reliability and Societal Safety—Aven & Vinnem (eds) 2007 Taylor & Francis Group (Year: 2007).*

(Continued)

*Primary Examiner* — John C Kuan
(74) *Attorney, Agent, or Firm* — Greenberg Traurig, LLP

(57) ABSTRACT

A server system can operate to function as an automatic association of tags defining a system within a process. The operations include accessing tags and associated signals including a plurality of data values over time indicative of a physical property, behavior or measurement of a component of the process. For each signal, calculating a time-weighted average over a specific time period, selecting a specific number of different day periods sampled from the tags and signals, and for each tag, calculating a slope and intercept by calculating a linear regression of plurality of signals over the specific time period. Further, calculating a residual value of each data value of the signals over the specific time period, and calculating a normalized value of each residual value, and then calculating the absolute value of the dot product of the normalized residual value and the residual value of a subsequent number of tags.

16 Claims, 4 Drawing Sheets

(56) References Cited

U.S. PATENT DOCUMENTS

| | | | |
|---|---|---|---|
| 2011/0282866 A1* | 11/2011 | Erickson | G06F 16/24568 |
| | | | 707/722 |
| 2014/0012901 A1 | 1/2014 | Ruhl et al. | |
| 2014/0258198 A1* | 9/2014 | Spivack | G06N 5/046 |
| | | | 706/21 |

OTHER PUBLICATIONS

Baraldi et al., "Signal Grouping for Condition Monitoring of Nuclear Power Plant Components" Advances in Safety, Reliability and Risk Management: ESREL 2011, Sep. 2011, France, pp. 1-13. hal-00721033 (Year: 2011).*

Leonardo et al., "Distributed Consistent Data Association" 2017 IEEE International Conference on Robotics and Automation (ICRA) (Year: 2017).*

Prof. Andy Field, "Linear Models: Looking for Bias", 2016, Retrieved from the Internet: <URL: https://www.discoveringstatistics.com/repository/linearmodelsbias.pdf>.

M. Bilodeau et al., "The R Package groc for Generalized Regression on Orthogonal Components", Journal of Statistical Software, May 2015, vol. 65, Issue 1 Retrieved from the Internet: <URL: https:www.researchgate.net/publication/269166139>, pp. 1-29.

Korean Intellectual Property Office; PCT International Search Report, Issued in Connection to PCT/US2019/045724; dated May 7, 2020; 3 pages; Korea.

Korean Intellectual Property Office; PCT Written Opinion of the International Searching Authority, Issued in Connection to PCT/US2019/045724; dated May 7, 2020, 4 pages; Korea.

\* cited by examiner

SERVER AND SYSTEM FOR AUTOMATIC SELECTION OF TAGS FOR MODELING AND ANOMALY DETECTION

CROSS-REFERENCE TO RELATED APPLICATIONS

This application claims the benefit of and priority to U.S. Provisional Patent Application No. 62/715,746, filed Aug. 7, 2018, entitled, "SERVER AND SYSTEM FOR AUTOMATIC SELECTION OF TAGS FOR MODELING AND ANOMALY DETECTION", the entire contents of which are incorporated herein by reference.

BACKGROUND

Computerized industrial control automation systems and networked computerized systems are routinely utilized to monitor, log, and display relevant manufacturing/production events and associated data, and provide supervisory level control and manufacturing information and diagnostics. Typical industrial processes are extremely complex and generate substantially greater volumes of information than any human could possibly digest in the information's raw form.

By way of example, it is common to have thousands of sensors and control elements (e.g., actuators for physical assets) monitoring and/or controlling aspects of a multistage process within an industrial facility. These sensors are of varied type and report on many characteristics of the process. Their outputs can similarly vary in the meaning of their measurements, in the amount of data sent for each measurement, and in the frequency of their measurements. Moreover, for accuracy and to enable quick response, some of these sensors/control elements take one or more measurements every second or less. Multiplying a single sensor/control element by thousands of sensors and control elements (a typical industrial control environment) results in an overwhelming volume of data flowing into the manufacturing information and process control system. Distributing the entire volume of data to or from all user devices overburdens communications networks and can unnecessarily utilizes network resources by sending data irrelevant to users associated with one or more user devices.

"Historization" is a vital task in the industry as it enables analysis of data representing historical information to improve industrial processes. As more data get logged into operational historians, customers are looking for ways to make sense out of the data. For example, a plant can have many valves that control the flow into many tanks. The historian starts with no notion of which valve goes to which tank.

If interrelated and/or associated components can be automatically detected, the knowledge of these relationships can be used to suggest data tags to analyze together. For example, if an operator or engineer is looking at a line chart for a given tank, the system can suggest adding a line for the attached valves. The knowledge of these relationships can also be used to suggest search results. If a user has searched for a tank, the system can include the related inlet and outlet valves in the search results. Further, the knowledge of these relationships can be used to provide a network diagram of tag relationships.

The knowledge of these relationships can also be used to provide input to anomaly detection systems to monitor ongoing relationships. As just one non-limiting example, if it is known that opening an inlet valve always fills the tank, and one day the valve is opened and the tank doesn't fill, one or more users can be notified.

SUMMARY OF THE INVENTION

Some embodiments include a computer-implemented method comprising providing a server system including at least one processor, and providing at least one non-transitory computer-readable storage medium in data communication with the at least one processor. In some embodiments, the at least one non-transitory computer-readable storage medium includes program logic that when executed by the at least one processor, causes the server system to operate to function as an automatic association of tags defining a system within a process. For example, in some embodiments, operations comprise accessing a plurality of tags and associated plurality of signals comprising a plurality of data values over time indicative of a physical property, behavior or measurement of a component of the process. Further, in some embodiments, operations comprise for each signal of the plurality of signals, calculating a time-weighted average over a specific time period. Further, in some embodiments, operations comprise for each signal, selecting a specific number of different day periods sampled from the plurality of tags and associated plurality of signals. In some embodiments, operations comprise for each tag of the plurality of tags, calculating a slope and intercept by calculating a linear regression of plurality of signals over the specific time period. Further, in some embodiments, operations comprise calculating a residual value of each data value of the plurality of signals over the specific time period by subtracting an expected value calculated from the linear regression from the actual value of each data value of plurality of signals over the specific time period. In some further embodiments, the operations comprise calculating a normalized value of each residual value by subtracting its mean from all of its samples and dividing each sample by its residual standard deviation. In some embodiments, the operations comprise calculating the absolute value of the dot product of the normalized residual value and the residual value of a following number of tags of the plurality of tags.

In some embodiments, the operations comprise assigning the smallest of the dot products calculated for each specific time period as a score, and recording a top number of scores and associated tag names so that each tag includes the top number of most closely associated tags and scores.

In some embodiments, the specific time period is ten minutes. In some embodiments, the specific number of different day periods is three. In some further embodiments, the day periods comprise a two-day period. In some embodiments, the top number of scores comprises the top five scores, and the top five closely associated tags and scores comprises a system within the system. In some further embodiments, the following number of tags of the plurality of tags is equal to one thousand tags.

Some embodiments include a server system comprising at least one processor configured to be coupled to an industrial process, and a non-transitory computer-readable storage medium for tangibly storing thereon program logic for execution by the processor. In some embodiments, the program logic comprises logic executable by the at least one processor for receiving at least one data communication from at least one industrial control system of the industrial process. Further, the at least one data communication comprising a plurality of signals comprising a plurality of data values and associated plurality of tags received over time from the industrial process. In some embodiments, the logic executable by the at least one processor that automatically associates tags defines a system within the industrial process, where the automatic association is operated by at least a portion of the program logic executable by the at least one processor by calculating a time-weighted average over a specific time period for each signal of the plurality of signals. Further, in some embodiments, by selecting a specific number of different day periods sampled from the plurality of tags and associated plurality of signals. Further, in some embodiments by performing a linear regression of plurality of signals over the specific time period for each tag of the plurality of tags. Further, in some embodiments by calculating a slope and intercept of the linear regression. Further, in some embodiments by calculating a residual value of each data value of the plurality of signals over the specific time period by subtracting an expected value calculated from the linear regression from the actual value of each data value of plurality of signals over the specific time period. Further, in some embodiments by calculating a normalized value of each residual value by subtracting its mean from all of its samples and dividing each sample by its residual standard deviation. Further, in some embodiments by calculating an absolute value of a dot product of the normalized residual value and the residual value of a following number of tags of the plurality of tags. Further, in some embodiments by assigning the smallest of the dot products calculated for each specific time period as a score. Further, in some embodiments by defining the system by recording a top number of scores and associated tag names so that each tag includes the top number of most closely associated tags and scores.

In some embodiments, a specific time period is between five and ten minutes. In some embodiments, the specific time period is more than ten minutes. In some further embodiments, the specific number of different day periods is three. In some embodiments, the day periods comprise a two-day period. In some embodiments, the top number of scores comprises the top five scores, and the top five closely associated tags and scores defines the system. In some embodiments, the following number of tags of the plurality of tags is equal to one thousand tags. In some further embodiments, the tags of the plurality of tags over the specific time period are sorted by name. In some embodiments, the scores are calculated for all pairs of tags within the following number of tags of the plurality of tags. In some embodiments, the top number of scores and associated tag names is calculated for x-axis tags and y-axis tags.

DETAILED DESCRIPTION

Figure 1:
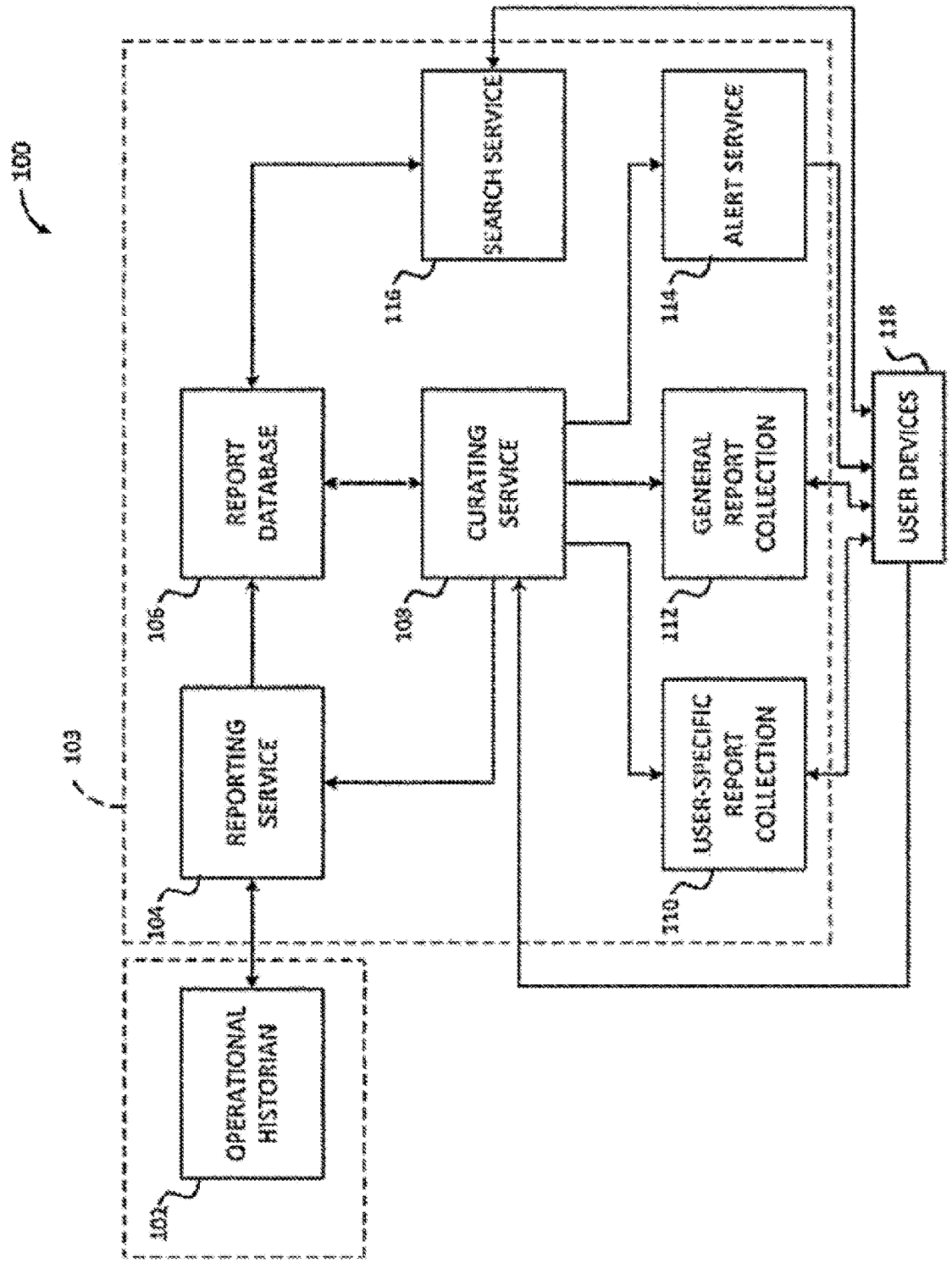
FIG. 1 illustrates an operational historian data pattern detection and communication services system according to some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention herein generally describe non-conventional approaches for systems and methods for automatic process data analysis that are not well-known, and further, are not taught or suggested by any known conventional methods or systems. Moreover, the specific functional features are a significant technological improvement over conventional methods and systems, including at least the operation and functioning of a computing system that are technological improvements. These technological improvements include one or more aspects of the systems and method described herein that describe the specifics of how a machine operates, which the Federal Circuit makes clear is the essence of statutory subject matter.

One or more of the embodiments described herein include functional limitations that cooperate in an ordered combination to transform the operation of a data repository in a way that improves the problem of data storage and updating of databases that previously existed. In particular, some embodiments described herein include system and methods for managing single or multiple content data items across disparate sources or applications that create a problem for users of such systems and services, and where maintaining reliable control over distributed information is difficult or impossible.

The description herein further describes some embodiments that provide novel features that improve the performance of communication and software, systems and servers by providing automated functionality that effectively and more efficiently manages resources and asset data for a user in a way that cannot effectively be done manually. Therefore, the person of ordinary skill can easily recognize that these functions provide the automated functionality, as described herein, in a manner that is not well-known, and certainly not conventional. As such, the embodiments of the invention described herein are not directed to an abstract idea and further provide significantly more tangible innovation. Moreover, the functionalities described herein were not imaginable in previously-existing computing systems, and did not exist until some embodiments of the invention solved the technical problem described earlier.

Some embodiments of the invention include systems and methods for detecting and/or identifying, and visualizing interrelated and/or associated components that can be automatically detected. In some embodiments, detecting and/or identifying and/or visualizing interrelated and/or associated components can be used to suggest "tags" to analyze together. As used herein, a tag can comprise a sequence of letters and/or numbers and can include process control tags associated with a process control system, process components, and/or any process variables, time-series data, or other data, etc.) In some embodiments, the tag can comprise the asset identification or data associated with the asset. For example, in some embodiments, if an operator or engineer is looking at a line chart or other system layout for a given industrial component, the system can suggest adding a line or other conventional relationship marker for other coupled components. In some embodiments, the industrial components that can be identified and linked in this way can include any conventional industrial component, including, but not limited to, tanks or reservoirs, meters, valves, flow restrictors or diverters, heating or cooling assemblies, separators, filters or filtration systems, mixers, pumps, optical systems, electrical systems, electromagnetic systems, etc. In some embodiments, the tag or tag data can comprise tag metadata or metadata.

In some embodiments, the knowledge of one or more the industrial components that include links, coupling, and/or operational relationships with one or more the industrial components can also be used to enhance or suggest search results (e.g., if an operator is searching for one or more components, one or more systems, and/or one or more operational or functional relationships). For example, in one non-limiting embodiment, if a user has searched for tank, the system can include the related inlet and outlet valves in the search results.

In some embodiments of the invention, the knowledge of one or more the industrial components that include links, coupling, and/or operational relationships with one or more the industrial components can be used to provide a network diagram of tag relationships. In some embodiments of the invention, the knowledge of these relationships can also be used to provide input to anomaly detection systems or other monitoring and control systems to monitor ongoing relationships.

A non-limiting example of a historian system 100 for auto selection of tags for modeling and anomaly detection is illustrated in FIG. 1. In some embodiments, the system 100 shown can analyze data stored in an operational historian and transform that data into timely reports that are communicated to appropriate devices at appropriate times and manners. In this manner, aspects of the system 100 filters (e.g., curates) the data to raise visibility of the data to users (e.g., via user devices) without overwhelming them and/or overburdening communications networks. In some embodiments, the system 100 can include an operational historian 102, and/or a reporting service 104, and/or a report database 106, and/or a curating service 108, and/or a user-specific report collection 110, and/or a general report collection 112, and/or an alert service 114, and/or a search service 116. In some embodiments of the invention, the system 100 can provides historian news feed of generated reports (i.e., stories) for users based on data provided by an operational historian and/or other providers.

In some embodiments, the operational historian 102 can be adapted to store (e.g., "historize") various types of data related to an industrial process. In some embodiments, the data includes, but is not limited to, time-series data, metadata, event data, configuration data, raw time-series binary data, tag metadata, diagnostic log data, and the like. In some embodiments, the operational historian 102 is also adapted to record trends and historical information about the industrial process for future reference. Some embodiments include an operational historian 102 that stores data about various aspects of an industrial process in quantities that humans cannot interpret or analyze. For example, in some embodiments, an operational historian may receive two million or more data values (e.g., tags relating to process control components, process variables, etc.) every second. In some embodiments, the historian 102 comprises processor-executable instructions embodied on a storage memory device (e.g., as part of a server computing device) enabled to provide the operational historian 102 via a software environment. In some embodiments, the operational historian 102 includes Wonderware® Historian and Wonderware® Online software commercially available from AVEVA Group plc.

In some embodiments, the reporting service 104 illustrated by FIG. 1 is adapted to retrieve data from operational historian 102, detect patterns in the retrieved data, generate reports that include information about the detected patterns, and store the generated reports in the report repository, such as a database 106. Some embodiments include a reporting service 104 that comprises processor-executable instructions embodied on a storage memory device to provide reporting service 104 via a software environment. For example, in some embodiments, a reporting service 104 may be provided as processor-executable instructions that comprise a procedure, a function, a routine, a method, and/or a subprogram utilized independently or in conjunction with additional aspects of system 100 by computing device 103. Further details of reporting service 104 are provided herein.

In at least one embodiment of the invention, the reporting service 104 is adapted to retrieve data from operational historian 102 by transmitting a query to operational historian 102, which operational historian 102 receives and uses to select stored data that matches the query. In some embodiments, the operational historian 102 then transmits the selected data to reporting service 104.

In some embodiments, the reporting service 104 may retrieve data continuously or at regular or other intervals. In the embodiment illustrated by FIG. 2, reporting service 104 retrieves and/or receives data from additional sources, including one or more of external third-party reporting applications (e.g., via an Application Programming Interface (API) of reporting service 104), built-in reporting services (e.g., Wonderware® Online software built-in reporters), application specific reporting services based on a client application configuration, and a human machine interface (HMI). Other embodiments include additional reporting entities that may be utilized to extend the capability of reporting service 104.

In some embodiments, the reporting service 104 can be adapted to analyze the data using algorithms and to detect certain patterns (e.g., "patterns of interest") and/or non-conformities in the data. Some algorithms include statistical algorithms, machine learning algorithms, rules-based algorithms, and the like. In some embodiments, upon detecting certain patterns, the reporting service 104 can generate reports about these detected patterns. In some embodiments, a report can include text, graphics (e.g., graphs, images, etc.), and metadata. In some embodiments, the reports may include the information about the detected patterns in a format that is amenable to the curating service 108 and/or a format that is human-understandable when displayed via a display device and/or a Human Machine Interface device. In this manner, reporting service 104 transforms the data from a format that is unintelligible to curating service 108 and humans into a format that is intelligible to curating service 108 and humans when displayed via a device.

In some embodiments, after generating the reports, reporting service 104 can transmit the reports to the report database 106 for storage. In some embodiments, the reporting service 104 is configurable to transmit the reports to report database 106 via an HTML interface, a REST interface, an ODATA interface, and similar interfaces. In some embodiments, system 100 includes a plurality of reporting services 104 that each retrieve data from operational historian 102, detect patterns in the data, generate reports, and store the reports in report database 106. Some embodiments utilize a plurality of reporting services, and each reporting service can operate independently or the collective operating services can operate in parallel on portions of a larger reporting task.

In some embodiments, the report database 106 can be adapted to store reports as an organized collection of data. In some embodiments, the report database 106 can store the reports in a central location for access by a wide variety of systems and devices. Further, in some embodiments, the curating service 108 can intelligently review reports stored in database 106, rank and/or classify reviewed reports, and route (e.g., distribute) ranked reports to collections, devices, other services, and the like. In some embodiments, the curating service 108 can moderate reports and raise their visibility to users at any desired frequency and in a manner such that users will not be overwhelmed with data, but instead will be provided with useful information in the reports at times and manners that are most appropriate for each specific user or groups of users.

For example, in some embodiments, for each user, curating service 108 can determine whether a particular report should appear on a primary/front page of a feed for that user, on a secondary page for that user, or just be archived in a searchable format for that user. In some embodiments, by distributing relevant reports to certain user devices, curating service 108 can reduce the burden on communications networks. In some embodiments, artificial intelligence can be used by the curating service 108 to help determine some or all aspects of the reporting function, including what information is likely to be desired, what format is likely most helpful, and the pages and feeds for a particular user can be optimized over time.

In some embodiments, the curating service 108 can be configurable to take additional actions based on the relevance of a specific report for a particular user, such as beep or alert a user device 118 of the user, as further described herein. In another embodiment, curating service 108 can function as a filter to determine which of the multitude of reports in report database 106 are transmitted to certain users and at which times those reports are transmitted.

In some embodiments, the curating service 108 can comprise processor-executable instructions embodied on a storage memory device to provide curating service 108 via a software environment. For example, in some embodiments, the curating service 108 can be embodied by processor-executable instructions that comprise a procedure, a function, a routine, a method, and/or a sub-program utilized independently or in conjunction with additional aspects of system 100 by computing device 103.

According to an embodiment of the disclosure, curating service 108 can be adapted to utilize passive evaluation factors to intelligently review reports stored in database 106. As reports are received by database 106 from reporting service 104, curating service 108 can be adapted to give each report a general score and a per-user score based on various factors. Some factors based on report content include, but are not limited to, tags on the same chart, tags on the same window, tags on the same analysis, "SmartGlance" reports, tags from the same data source, tags with similar names, tags with similar summary statistics, correlated tags, and the like. Further, some evaluation factors based on actions taken by users include, but are not limited to, selecting (e.g., clicking, tapping, etc. via a HMI) on a report, selecting a related tag, search history, actions of similar users (e.g., operators of a particular subsystem, all operators, all managers, etc.), and the like.

In some embodiments, the actions taken by users may be provided as feedback from user devices 118 to curating service 108. In some embodiments, the curating service 108 can be adapted to utilize factors based on deliberate user actions such as voting, answering polls on reports (e.g., "thumbs up", "not a problem", etc.), and the like. Furthermore, in some embodiments curating service 108 can be adapted to utilize a specific assignment of certain tags, process control devices, and the like to a certain user in determining the general and per-user scores.

In some embodiments, the curating service 108 can be adapted to rank, for each user or user group, reviewed reports based on report content and data regarding user interest patterns. In some embodiments, curating service 108 can ranks reports with respect to an operator of a particular subsystem of an industrial process. In some embodiments, when an intelligent review of a report by curating service 108 reveals that the report concerns a component in the operator's subsystem, curating service 108 can be adapted to rank that report higher with respect to the operator than a report about a component in a different subsystem for which the operator is not responsible. In some embodiments, curating service 108 can be adapted to use data regarding component information regularly viewed by the operator (e.g., via a user profile) and when an intelligent review of a report by curating service 108 reveals that the report concerns a component that the operator regularly views, curating service 108 is adapted to rank that report higher with respect to the operator than a report about items that the operator does not regularly view. In some embodiments, the ranking performed by curating service 108 is a numerical ranking or score. However, some embodiments include any ranking or scoring mechanism that may be utilized that indicates a higher relevance or importance of one report over a different report. In an embodiment, report ranking is made available to reporting service 104 which reporting service 104 uses to tailor report generation to generate more highly ranked reports. In some embodiments, curating service 108 directs reports to user devices 118 based on context including, but not limited to, area(s) of interest, a user's own events, and events of other operators in a team.

In some embodiments, the curating service 108 can be adapted to utilize the ranking of reports to classify the reports and determine which actions to take with respect to a particular report. For example, in some embodiments, the curating service 108 can classify and route reports based on a general interest level (e.g., score), a user-specific interest level (e.g., score), and/or urgency. In some embodiments, the curating service 108 can determine based on the ranking of a report to not forward that report to any device or user but instead continue to store the report in database 106 where it is available for accessing via the search service 116.

In some embodiments, the curating service 108 can determine based on the ranking of a report whether to transmit the report to the user-specific report collection 110. In another embodiment, the curating service 108 can determine based on the ranking of a report to transmit the report to the general report collection 112. In yet another embodiment, the curating service 108 can determine based on the ranking of a report to transmit the report in real-time in the form of an alert to one or more user devices 118 via an alert service 114. In some embodiments, additional actions curating service 108 may take place based on a classification of a report include displaying the report as a news story on a news feed, displaying the report as an activity on related trends, displaying the report only when searched via search service 116, and displaying reports on related process graphics (e.g., displaying a line plot of a particular property of an industrial process with its anomalies annotated).

As described above, curating service 108 classifies and routes reports based on urgency and/or other time-based factors according to embodiments of the invention. For example, in some embodiments, the curating service 108 can determine that a report includes content that is time-sensitive and/or highly consequential to an industrial process and transmit the report to user devices 118 via alert service 114 in addition to and/or rather than general report collection 112. In some embodiments, the curating service 108 can analyze the volume of reports generated by reporting service 104 over a given time period (e.g., work shift, day, etc.) and distributes reports accordingly. For example, in some embodiments, when the volume of reports generated by reporting service 104 is low during a particular day (e.g., a "slow" news day), curating service 108 distributes fewer reports with lower rankings. In a contrasting example, when the volume of reports generated by reporting service 104 is high during a particular day (e.g., a "fast" news day), the curating service 108 distributes more and higher ranked reports. Such an urgency-based operation of curating service 108 may also be used to distribute a consistent volume of reports over a given time period (e.g., 100 reports per day, etc.) such that curating service 108 alters the ranking threshold in order to achieve the requisite number of reports. The urgency-based operation of curating service 108 may also be used alter the ranking threshold such that only highly ranked (e.g., 95 out of 100, etc.) reports are published during a certain time period (e.g., days that a manager is scheduled to be on vacation, etc.).

Still referring to FIG. 1, in some embodiments, the user-specific report collection 110 can be adapted to receive reports from curating service 108 and organize the reports into lists (e.g., feeds) that are kept current and made available to users and/or groups of users via user devices 118. For example, user-specific report collection 110 may be a database, according to an aspect of the disclosure. In some embodiments, the user-specific report collection 110 provides feeds that indicate new reports that have not yet been accessed by user devices 118 and/or reports that have not been displayed by user devices 118. In some embodiments, the general report collection 112 can be adapted to receive reports from curating service 108 and present them in a manner such that they may be browsed through via user devices 118.

For example, in some embodiments, general report collection 112 may be a database, according to an aspect of the disclosure. In some embodiments, the general report collection 112 organizes reports in such a way to support navigation of the reports via user devices 118. In some embodiments, the general report collection 112 organizes reports such that reports having higher general relevance to an industrial process than other reports are stored in a manner such that those reports are displayed in more prominent positions when accessed and displayed via user devices 118.

Referring again to FIG. 1, in some embodiments, the alert service 114 can be adapted to receive reports from curating service 108 and deliver received reports to user devices 118 in real-time. For example, in some embodiments alert service 114 may deliver reports to user devices 118 in the form of emails, text messages, mobile device notifications (e.g., user interface notification), pager notification, and the like. In some embodiments, the alert service 114 comprises processor-executable instructions embodied on a storage memory device to provide alert service 114 via a software environment. For example, in some embodiments, alert service 114 may be provided as processor-executable instructions that comprise a procedure, a function, a routine, a method, and/or a subprogram utilized independently or in conjunction with additional aspects of system 100 by computing device 103 according to another embodiment. Further details of alert service 114 are provided herein. In an embodiment, alerts from alert service 114 are more important than reports.

In some embodiments, the search service 116 of FIG. 1 can be adapted to allow reports stored in database 106 to be searched via user devices 118. In some embodiments, the search service 116 can be adapted to search database 106 for reports containing certain content. In another embodiment, the search service 116 can be adapted to search database 106 for reports by relation to historian entities involved in the reports. In some embodiments, the search service 116 can comprise processor-executable instructions embodied on a storage memory device to provide search service 116 via a software environment. For example, in some embodiments, the search service 116 may be provided as processor-executable instructions that comprise a procedure, a function, a routine, a method, and/or a subprogram utilized independently or in conjunction with additional aspects of system 100 by computing device 103 according to another embodiment. Further details of search service 116 are provided herein.

In some embodiments, the user devices 118 of FIG. 1 can be adapted to receive from and transmit data to user-specific report collection 110, general report collection 112, alert service 114, and/or search service 116. In some embodiments, user devices 118 can be adapted to provide feedback on usage characteristics of the user devices 118 to curating service 108. In some embodiments, user devices 118 include, but are not limited to, personal computers, laptops, tablet computers, mobile communication devices, smartphones, and the like.

Figure 2:
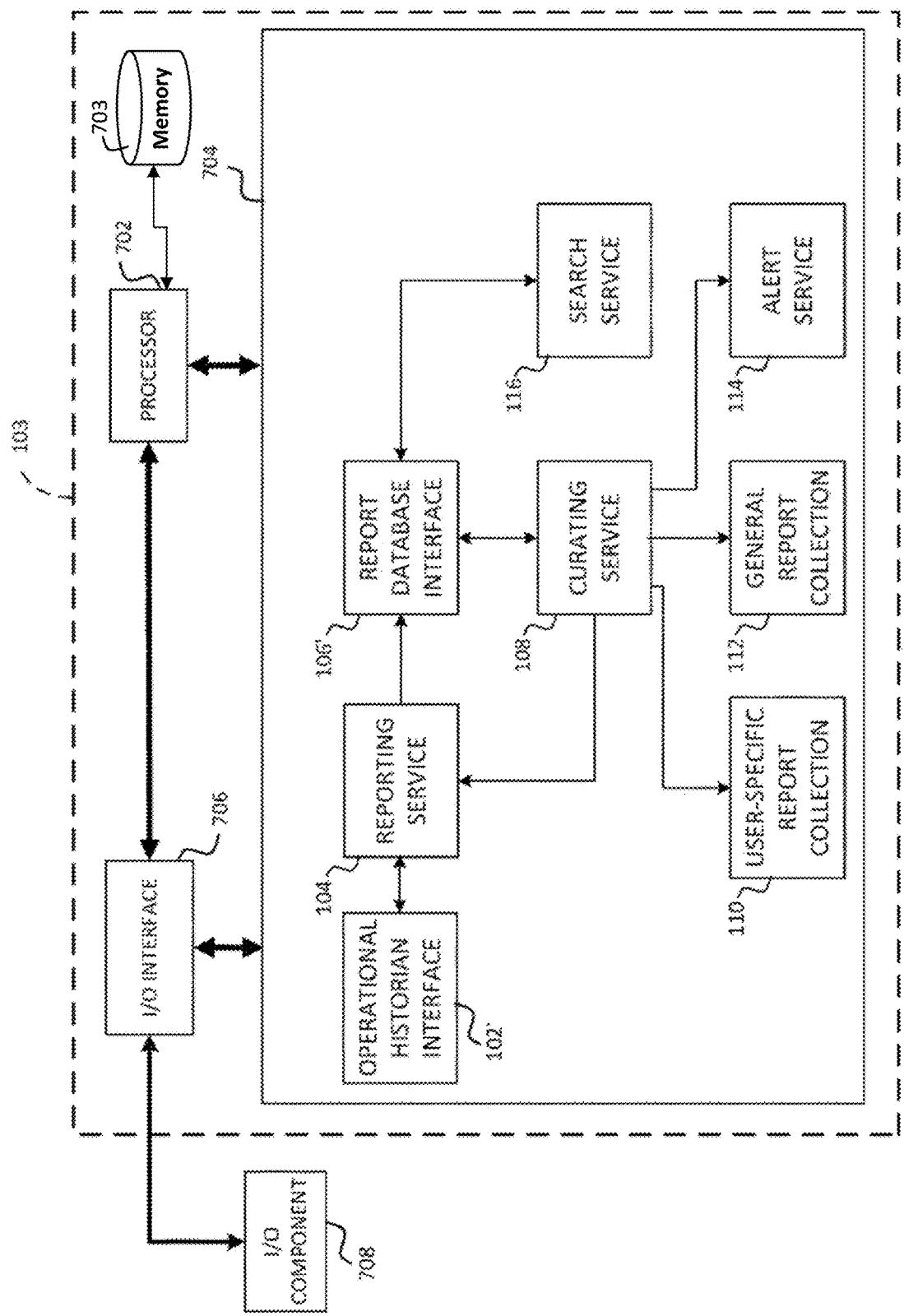
FIG. 2 illustrates a system architecture of a computing device programmed to provide aspects of the operational historian data pattern detection and communication services system of FIG. 1 in accordance with some embodiments of the invention.

FIG. 2 illustrates an architecture of computing device 103 programmed to provide aspects of the operational historian data pattern detection and communication services system 100 via a software environment. In this embodiment, computing device 103 includes a processor 702, memory 703, a memory 704, and an input/output (I/O) interface 706 that interfaces with an I/O component 708. In some embodiments, the memory 704 includes an operational historian interface 102', reporting service 104, a report database interface 106', curating service 108, user-specific report collection 110, general report collection 112, alert service 114, and search service 116 each embodied in processor-executable instructions for executing by processor 702.

In some embodiments, the processor 702, memory 703, 704, and I/O interface 706 are communicatively connected and/or electrically coupled to each other. In some embodiments, the I/O interface 706 can be communicatively and/or electrically connected to the I/O component 708. In some embodiments, the processor 702 can be adapted to execute processor-executable instructions stored in the memory 704 for implementing the operational historian interface 102', reporting service 104, report database interface 106', curating service 108, user-specific report collection 110, general report collection 112, alert service 114, and/or search service 116. The I/O interface 706 of FIG. 2 provides a physical data connection between computing device 103 and I/O component 708. In some embodiments, I/O interface 706 is a network interface card (NIC) or modem and I/O component 708 is a telecommunications network.

In some embodiments, the operational historian interface 102' of FIG. 2 can be adapted to provide a connection between computing device 103 and operational historian 102. In some embodiments, the operational historian interface 102' retrieves and/or receives data from operational historian 102 via I/O interface 706, as further described herein. In some embodiments, the report database interface 106' of FIG. 2 can be adapted to provide a connection between computing device 103 and a computer-readable storage medium for storing report databases 106. In some embodiments, the report database interface 106' can facilitate publishing of reports from reporting service 104 to report database 106 via I/O interface 706, as further described herein. In another embodiment, the report database interface 106' can facilitate access to report database 106 by curating service 108 and search service 116 via I/O interface 706, as further described herein.

Figure 3:
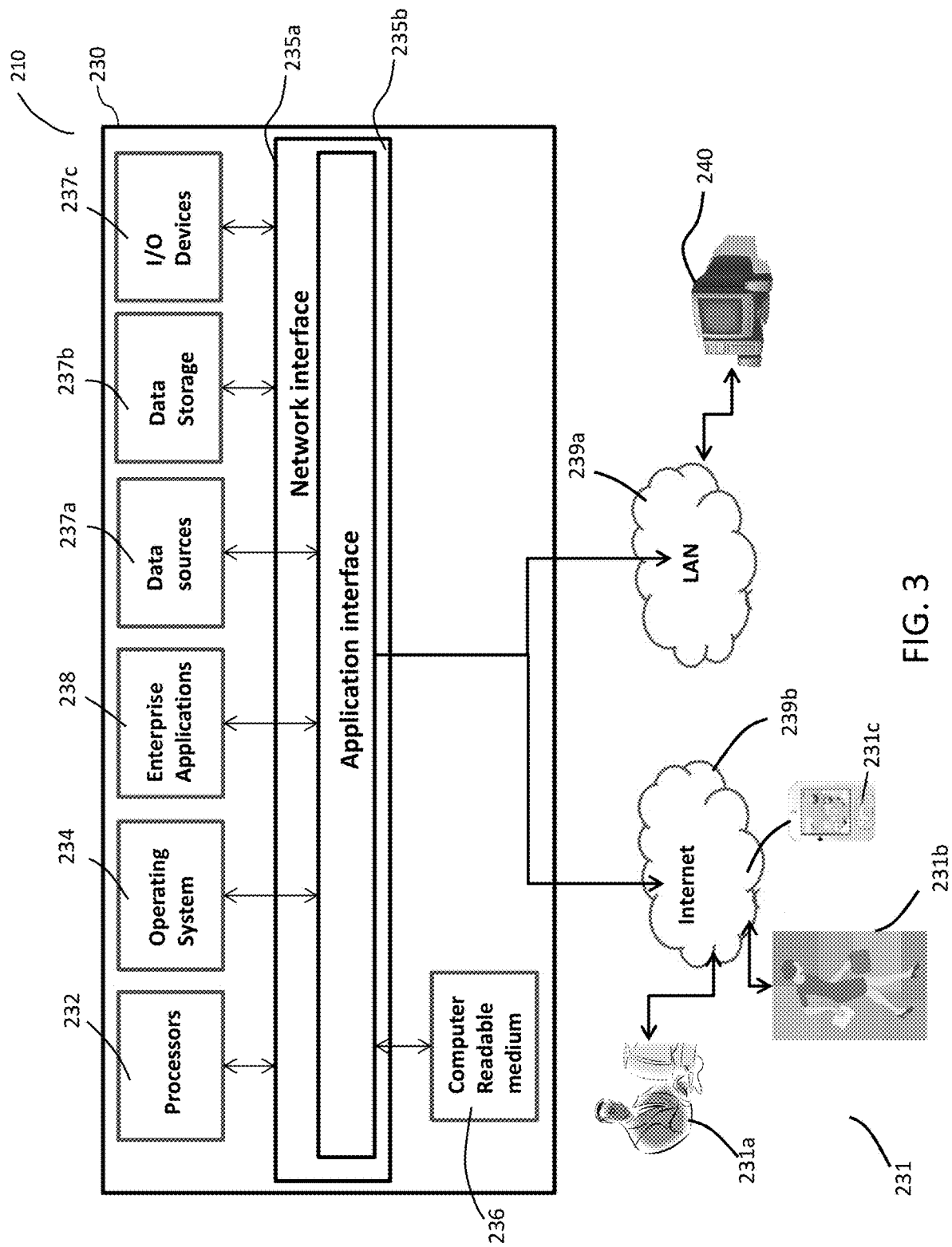
FIG. 3 illustrates a computer system enabling or operating the computer device of FIG. 2 in accordance with some embodiments of the invention.

FIG. 3 illustrates a computer system 210 enabling the computer device 103 of FIG. 2 in accordance with some embodiments of the invention. For example, in some embodiments, the computer system 210 can operate and/or process computer-executable code of one or more software modules of the aforementioned system. Further, in some embodiments, the computer system 210 can operate and/or display information within one or more graphical user interfaces. In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that the invention can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on computer-readable storage media within the system 210 and on computer-readable storage media coupled to the system 210. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the system 210 can comprise at least one computer readable medium 236 coupled to at least one data source 237a, and/or at least one data storage device 237b, and/or at least one input/output device 237c. In some embodiments, the invention can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, the computer readable medium 236 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 236 can transmit or carry instructions to at least one computer 240 and/or at least one user 231, including a router, private or public network, or other transmission device or channel, both wired and wireless. In some embodiments, the software modules 238 can be configured to send and receive data from a database (e.g., from a computer readable medium 236 including data sources 237a and data storage 237b that can comprise a database), and data can be received by the software modules 238 from at least one other source. In some embodiments, at least one of the software modules 238 can be configured within the system to output data to at least one user 231 via at least one graphical user interface rendered on at least one digital display.

In some embodiments of the invention, the computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include one or more computers 240 coupled through the LAN 239a that can be configured for any type of user including an administrator.

Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules including at least one application 238 via an input and output ("I/O") device 237c. In some other embodiments, the system 210 can enable at least one user 231 to be coupled to access applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some further embodiments, the user 231 can comprise a mobile user 231b coupled to the system 210. In some embodiments, the user 231b can use any mobile computing device 231c to wireless coupled to the system 210, including, but not limited to, personal digital assistants, and/or cellular phones, mobile phones, or smart phones, and/or pagers, and/or digital tablets, and/or fixed or mobile internet appliances.

Figure 4:
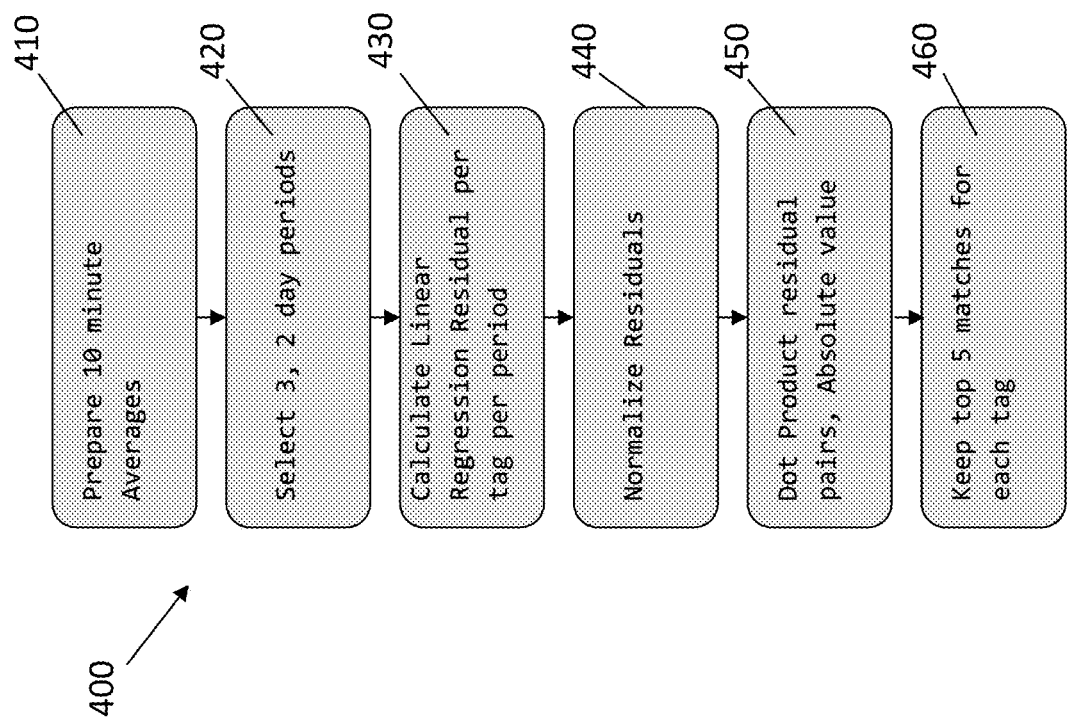
FIG. 4 illustrates a process flow in accordance with some embodiments of the invention.

In some embodiments, the above-described system 100 can analyze data stored in an operational historian to facilitate auto selection of tags for modeling and anomaly detection. For example, FIG. 4 illustrates a process flow 400 in accordance with some embodiments of the invention that can comprise a method to automatically identify physical system relationships using raw time series data and tag metadata stored an operational historian (e.g., such as the operation historian described earlier). In some embodiments, the system and method can be used to automatically find systems in operational historians. In other embodiments, the system and method can be used to compare one or more pairs of tags. In some embodiments of the invention, the method can use "sliding windows" to reduce analysis time taken to O(n) instead of O(n^2). In some further embodiments, the system can be used to prepare a network diagram for system relationships instead of finding clusters. In some embodiments, by having a fast algorithm to identify systems, tags can be provided to users as systems instead of individually.

In one non-limiting embodiment, assuming a large system with 100,000 or more tagnames and the associated signals, a process 400 can comprise sorting signals by name. Signals that are close together in systems tend to be close together when sorted by name. This is especially true when the names use hierarchical encodes, such as the tagname "area1.line1.tank1.inlet". In the given example, the tagnames "area1.line1.tank1.outlet" and "area1.line1.tank1.level" would be relatively close together in a sorted list, while "area17.1in2.tank3.level" would have a loose association and tend to be further away in a sorted list.

Some embodiments include a computed ten-minute time weighted average for a signal over the range of the data (410). In some embodiments, every signal can be selected in three different two-day periods sampled from the training set (420). Some embodiments include an average interval of ten minutes. In some embodiments, the number of periods and the period duration can be modified as required for different data requirements. In some embodiments, each tag can perform a linear regression of the three different sample periods to find a slope and intercept for each period (430). In some embodiments, each period can calculate the expected value for each point based on the linear regression. In some embodiments, each period can compute a residual value by subtracting this expected value from the actual value of each point. In some embodiments, each period can give a residual for each sample period. In some embodiments, each period can normalize each residual signal by subtracting its mean from all samples and divide each sample by its residual standard deviation (440).

Referring to process 450, some embodiments include computing score, compute the dot product, calculating absolute values, and finding the lowest of three samples. For example, some embodiments include three sample periods. In some embodiments, each period can calculate scores for all pairs of tags within 1000 entries in a sorted list. In some embodiments, each period can keep the top scores for each tag. In some embodiments, each tag can equal (x). In some embodiments, each of the three periods can be calculated. In some embodiments, each of the 1000 tags can be sorted by name (y). Some embodiments include calculation of the absolute value of the dot product of the normalized residual of a tag and the residual of each of the next 1000 tags (sorted by name) (450). In some embodiments, the smallest of the three dot products can have a score for x and y.

In some embodiments, for every tag y, the system can look at all of tag x. In some embodiments, the system can pick the five best in the 90th percentile (which can change) and above. For example, some embodiments include recordation of the top five scores and the associate tag names, this can be done for x and y tags (460). In some embodiments, each tag can have five closely associated tags and scoring values. In some embodiments, the higher scoring tags can have tighter relationships.

Some embodiments include simple correlation. In some embodiments, when simple correlation is done, one or more tags with a consistent slope can appear perfectly correlated. In some embodiments, the actual slope of a tag does not matter, the waviness of a tag matters. In some embodiments, matches can be more likely to have close system relationships.

For the purposes of this disclosure the term "server" should be understood to refer to a service point which provides processing, database, and communication facilities. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as a Microsoft® Windows® Server, Mac OS X, Unix, Linux, and/or any other conventional operating system. Microsoft® and Windows® are registered trademarks of Microsoft Corporation, Redmond, Wash.

For the purposes of this disclosure a "network" should be understood to refer to a network that may couple devices so that communications may be exchanged, such as between a server and a client device, peer to peer communications, or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, "Integrated Services Digital Networks" (ISDNs), "Digital Subscriber Lines" (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple user or client devices with a network. A wireless network may employ stand-alone ad-hoc networks, mesh networks, wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including "Long Term Evolution" (LTE), WLAN, wireless router (WR) mesh, or 2nd, 3rd, 4th, or 5th generation (2G, 3G, 4G, or 5G) cellular technology, or the like. Network access technologies may enable wide area coverage for devices, such as client devices with varying degrees of mobility, for example. For example, a network may enable RF or wireless type communication via one or more network access technologies, such as "Global System for Mobile communication" (GSM), "Universal Mobile Telecommunications System" (UMTS), "General Packet Radio Services" (GPRS), "Enhanced Data GSM Environment" (EDGE), 3GPP LTE, LTE Advanced, "Wideband Code Division Multiple Access" (WCDMA), Bluetooth®, 802.11b/g/n, or the like. A wireless network may include virtually any type of wireless communication mechanism by which signals may be communicated between devices, such as a client device or a computing device, between or within a network, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a near field communication (NFC) device, a personal digital assistant (PDA), a handheld computer, a tablet computer, a phablet, a laptop computer, a set top box, a wearable computer, an integrated device combining various features, such as features of the forgoing devices, or the like.

A client device may vary in terms of capabilities or features, and claimed subject matter is intended to cover a wide range of potential variations. A web-enabled fixed or mobile device may include a browser application that is configured to receive and to send web pages, web-based messages, and the like. The browser application may be configured to receive and display graphics, text, multimedia, and the like, employing virtually any conventional web-based language.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A computer-implemented method, comprising:
providing a curating service configured to generate a report of a general score and a per-user score based on correlated tags and display the report via at least one graphical user interface rendered on at least one digital display;
providing a server system including at least one processor; and
providing at least one non-transitory computer-readable storage medium in data communication with the at least one processor, the at least one non-transitory computer-readable storage medium including program logic that when executed by the at least one processor, causes the server system to operate to function as an automatic association of tags defining a system within a process by:
accessing a plurality of tags and associated plurality of signals comprising a plurality of data values over time indicative of a physical property, behavior or measurement of a component of the process; and
for each of the plurality of signals, calculating a time-weighted average over a specific time period;
for each of the plurality of signals, selecting a specific number of different day periods sampled from the plurality of tags and associated plurality of signals;
for each tag of the plurality of tags, calculating a slope and intercept by calculating a linear regression of the plurality of signals over each period of the specific number of different day periods;
for each tag of the plurality of tags, calculating a residual value of each data value of the plurality of signals over each period of the specific number of different day periods by subtracting an expected value calculated from the linear regression from an actual value of each data value of the plurality of signals over each period of the specific number of different day periods;
for each tag of the plurality of tags, calculating a normalized value of the residual value for each data value of the plurality of signals over each period of the specific number of different day periods by subtracting a mean value of the residual values over each period of the specific number of different day periods from the residual value for each data value of the plurality of signals over each period of the specific number of different day periods and dividing the residual value for each data value of the plurality of signals over each period of the specific number of different day periods by its residual standard deviation;
for each of the plurality of tags, calculating an absolute value of a dot product of the normalized residual values and the residual values for each tag of the remainder of a following number of tags of the plurality of tags;
assigning each of the absolute values of the dot products calculated for the specific number of different day periods as a score; and
recording a top number of scores for each tag of the plurality of tags and associated tag names so that the tag is associated with the top number of most closely associated tags and scores;
wherein the top number of scores for each tag of the plurality of tags defines a subsystem within an industrial process; and
wherein when an intelligent review of a report by the curating service reveals that the report concerns a component in a subsystem, the curating service ranks the report higher with respect to a report about a component in a different subsystem.

2. The method of claim 1, wherein the specific time period is ten minutes.

3. The method of claim 1, wherein the specific number of different day periods is three.

4. The method of claim 1, wherein each period of the specific number of different day periods comprises a two-day period.

5. The method of claim 1, wherein the top number of scores comprises the top five scores, and the top five closely associated tags and scores define the subsystem within the industrial process for each tag of the plurality of tags.

6. The method of claim 1, wherein the following number of tags of the plurality of tags is equal to one thousand tags.

7. A server system comprising:
at least one processor configured to be coupled to an industrial process; and
a non-transitory computer-readable storage medium tangibly storing thereon program logic for execution by the processor, the program logic comprising:
logic executable by the at least one processor for receiving at least one data communication from at least one industrial control system of the industrial process, the at least one data communication comprising a plurality of signals comprising a plurality of data values and associated plurality of tags received over time from the industrial process; and
logic executable by the at least one processor that automatically associates tags defining a subsystem within the industrial process, wherein the automatic association is operated by at least a portion of the program logic executable by the at least one processor by:
providing a curating service configured to generate a report of a general score and a per-user score based on correlated tags and display the report via at least one graphical user interface rendered on at least one digital display;
calculating a time-weighted average over a specific time period for each of the plurality of signals;
selecting a specific number of different day periods sampled from the plurality of tags and associated plurality of signals;
performing a linear regression of plurality of signals over each period of the specific number of different day periods for each tag of the plurality of tags;
calculating a slope and intercept of the linear regression for each period of the specific number of different day periods for each tag of the plurality of tags;
for each of the plurality of tags, calculating a residual value of each data value of the plurality of signals over each period of the specific number of different day periods by subtracting an expected value calculated from the linear regression from an actual value of each data value of the plurality of signals over each period of the specific number of different day periods;

for each of the plurality of tags, calculating a normalized value of the residual value for each data value of the plurality of signals over each period of the specific number of different day periods by subtracting a mean value of the residual values over each period of the specific number of different day periods from the residual value for each data value of the plurality of signals over each period of the specific number of different day periods and dividing the residual value for each data value of the plurality of signals over each period of the specific number of different day periods by its residual standard deviation;

for each of the plurality of tags, calculating an absolute value of a dot product of the normalized residual values and the residual values for each tag of the remainder of a following number of tags of the plurality of tags;

assigning each of the absolute values of the dot products calculated for the specific number of different day periods as a score; and defining the subsystem within the industrial process by recording a top number of scores and associated tag names for each tag of the plurality of tags so that the tag is associated with the top number of most closely associated tags and scores;

wherein the server system is configured to use the top number of scores for each tag of the plurality of tags to automatically identify physical system relationships;

wherein the server system is configured to use the physical system relationships to automatically select tags for modeling and anomaly detection; and wherein when an intelligent review of a report by the curating service reveals that the report concerns a component in a subsystem, the curating service ranks the report higher with respect to a report about a component in a different subsystem.

8. The server system of claim 7, wherein the specific time period is between five and ten minutes.

9. The server system of claim 7, wherein the specific time period is more than ten minutes.

10. The server system of claim 7, wherein the specific number of different day periods is three.

11. The server system of claim 7, wherein each period of the specific number of different day periods comprises a two-day period.

12. The server system of claim 7, wherein the top number of scores comprises the top five scores, and the top five closely associated tags and scores define the subsystem within the industrial process for each tag of the plurality of tags.

13. The server system of claim 7, wherein the following number of tags of the plurality of tags is equal to one thousand tags.

14. The server system of claim 7, wherein the plurality of tags over the specific number of different day periods are sorted by name.

15. The server system of claim 7, wherein the scores are calculated for all pairs of tags within the following number of tags of the plurality of tags.

16. The server system of claim 7, wherein the top number of scores and associated tag names are recorded for each tag within the following number of tags of the plurality of tags.

* * * * *